United States Patent [19]
Komatsu

[11] 3,804,443
[45] Apr. 16, 1974

[54] IMPACT ABSORBING DEVICE USING COMPRESSIBLE LIQUID

[75] Inventor: Koichi Komatsu, Tokyo, Japan

[73] Assignee: Nissan Motor Company, Limited, Yokohama City, Japan

[22] Filed: Oct. 22, 1971

[21] Appl. No.: 191,926

[30] Foreign Application Priority Data
Oct. 26, 1970   Japan............................ 45-119095

[52] U.S. Cl.................................. 293/70, 267/116
[51] Int. Cl.......................... B60r 19/06, F16f 9/06
[58] Field of Search ............ 293/1, DIG. 2, 60, 70, 293/85, 86, 71 R, 71 P; 267/64 R, 64 B, 116, 139; 188/317, 318, 319; 252/78

[56] References Cited
UNITED STATES PATENTS

| | | | |
|---|---|---|---|
| 2,618,478 | 11/1952 | Conway | 267/64 |
| 3,008,746 | 11/1961 | Senger | 293/70 |
| 2,320,697 | 6/1943 | Binder | 188/88 |
| 2,398,187 | 4/1946 | McGregor et al. | 252/78 |
| 2,963,175 | 12/1960 | Thornhill | 213/223 |
| 2,856,035 | 10/1958 | Rohacs | 188/317 |
| 2,821,268 | 1/1958 | De Carbon | 188/317 |

FOREIGN PATENTS OR APPLICATIONS

| | | | |
|---|---|---|---|
| 485,685 | 10/1953 | Italy | 188/317 |

Primary Examiner—Gerald M. Forlenza
Assistant Examiner—Robert Saifer
Attorney, Agent, or Firm—Robert E. Burns; Emmanuel J. Lobato

[57] ABSTRACT

An impact absorbing device is adapted for use as a bumper of motor vehicles. The device has a piston which is movable in a liquid chamber occupied with a compressible liquid such as silicon oil. The piston divides the liquid chamber into two compartments which communicate with each other through a restricted passage formed in the piston. When the piston is moved in response to an impact exerted on the device, the liquid is circulated from one of the two compartments to the other so that the energy of the impact is dampened by the restricted flow of the liquid through the restricted passage. The device may additionally have a gas chamber which is isolated from the liquid chamber by a floating piston or the like, in which instance a fixed partition member is located in the liquid chamber adjacent the floating piston. Expansion of the liquid in the liquid chamber due to temperature rise therein is thus compensated for by the contraction of the gas chamber.

9 Claims, 3 Drawing Figures

IMPACT ABSORBING DEVICE USING COMPRESSIBLE LIQUID

This invention relates to an impact absorbing device and, more particularly, to an impact absorbing device using compressible liquids. The impact absorbing device herein disclosed is specifically adapted for being used as a bumper of a motor vehicle whereby an impact resulting from a collision encountered by the motor vehicle is dampened to protect the vehicle occupants from injury. It is, however, to be borne in mind that such is solely by way of example and that the device will prove useful for various other applications.

The impact absorbing devices which have thus far been proposed and practised for use as motor vehicle bumpers include mechanical destructible structures, compression springs or hydraulic springs. The mechanical destructible structures are broken or plastically deformed when subjected to ususual mechanical stresses and, consequently, are no longer serviceable once they have operated. The impact absorbing devices using the compression springs or hydraulic springs are operable on a repeated basis without replacement of their components and parts and are economically advantageous over the devices using the mechanical destructible structures. The devices using the compression springs, however, have a problem in that the efficiency of the energy of the impact being dissipated is limited due to the restrictions arising from the spring characteristics of the compression springs. In order that the compression springs, which usually are coil springs, be capable of absorbing energy of an impact with relatively great magnitude at a satisfactory efficiency and in a stabilized condition, it is of critical importance the springs have disproportionately large diameters, which apparently are reflected by large-sized constructions and accordingly increased production costs of the devices as a whole. Another problem is that, when the impact on the devices is claimed down or removed therefrom to permit the springs to resume their initial unloaded conditions, the energy which has been accumulated in the compression springs is suddenly released to cause the devices to be violently rebounded. This creates a so-called secondary collision condition in motor vehicles where such devices are used as bumpers. These problems are more or less avoided in the impact absorbing devices using the hydraulic springs in which the energy of the impact on the devices is largely consumed in forced displacement of liquid through restricted apertures and/or passages. The liquid used in the devices of this type is usually of the incompressible property so that the spring characteristics of such devices are still limited either in their actions responding to the collision conditions or in their movements restoring the initial conditions.

Hydraulic fluids are commonly thought of as incompressible but they actually have relatively low moduli of elasticity. Some oils exhibit considerably high compressibilities and, according to the experiments conducted by me, such compressibilities are largely proportional to the viscosities of the oils. The present invention has been completed on the basis of this discovery and it is an object of this invention to provide a new impact absorptive device in which the compressibility and viscosity of a compressible liquid are utilized to provide an increased impact-energy dissipating efficiency and improved spring characteristics.

Another object of the invention is to provide an impact absorbing device having a small-sized, compact construction which is ready for being installed in limited working space such as in a motor vehicle.

Still another object is to provide an impact absorbing device which is prevented from rebounding even in the event an impact on the device is instantaneously removed therefrom.

Still another object is to provide an impact absorptive device of the position-restorable type which is operable on a repeated basis without replacement or even maintenance servicing of its components and parts during use.

The impact absorbing device accomplishing these objects of the present invention includes, in its basic construction, a cylinder having opposed closed and apertured end walls and fast on a suitable stationary structure, a piston longitudinally slidable in the cylinder, a piston rod extending from the piston and projecting outwardly of the cylinder through the apertured end wall thereof, and stopper means limiting a movement of the piston toward the apertured end wall of the cylinder. The cylinder has defined at least partly therein a liquid chamber which is occupied with a compressible liquid such as silicon oil. This liquid chamber is divided by the piston into two compartments which are in constant communication with each other through a restricted passage formed in the piston. The piston is associated with relief valve means which is operable to permit the liquid in the liquid chamber to flow from one of the two compartments to the other only in a direction of movement of the piston rod subjected to an impact and moved away from the apertured end wall of the cylinder. The piston rod is securely connected at its leading end portion to a fender to receive a force of impact thereon.

The liquid, which is contained in the closed liquid chamber, is subject to expansion by a rise in temperature of the liquid during use with the result that the pressure in the liquid chamber fluctuates from time to time depending upon the ambient temperature. The problem of this nature may be solved through use of a specially designed temperature control device or a device adapted to compensate for the fluctuations of the pressure in the liquid chamber. Provision of such device, however, would result in intricate and large-sized construction of the impact absorbing device and, as such, is practically not acceptable.

It is, therefore, a further object of the present invention to provide an impact absorbing device in which the expansion of the liquid due to temperature rise is compensated for by means of simple and economical arrangement.

The impact absorbing device to accomplish this particular object thus includes movable partition means defining a gas chamber which is isolated from the liquid chamber and which is occupied with a gas under pressure. This partition means, which may be a floating piston, is movable toward and away from the closed end wall of the cylinder as the liquid pressure exerted thereon is increased and decreased. A fixed partition member is located in the liquid chamber adjacent the movable partition means and has formed therein a restricted passage providing communication across the fixed partition member. This restricted passage is usually smaller in cross sectional area that the restricted passage formed in the piston.

The features and advantages of the impact absorbing device in accordance with the present invention will be more clearly understood from the following description taken in connection with the accompanying drawings, in which.

Figure 1:
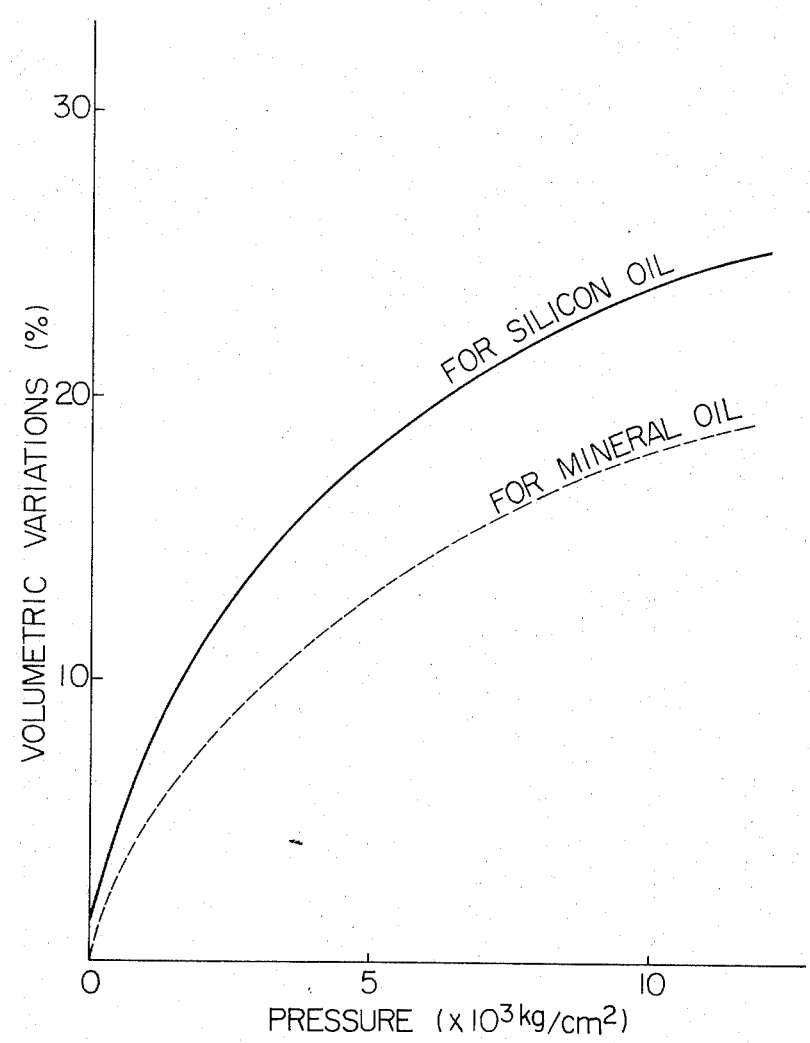
FIG. 1 is a graphic representation of the variations in per cent by volume of silicon and mineral oils in terms of pressure in kilogram per square centimeter as observed in the experiments conducted by me.

As previously mentioned, the invention herein disclosed owes its novelty to my new recognition that the spring characteristics of the impact absorbing device can be advantageously improved by the use of compressible liquid as a working medium of the device. The results of the experiments conducted by me on the silicon and mineral oils indicate, as observed in FIG. 1, that the silicon oil has a considerably greater compressibility than the mineral oil. The experiments have also indicated that the higher the viscosity of the silicon oil, the less is the compressibility thereof and that the viscosity of the silicon oil increases sharply as the pressure applied thereto rises, though not demonstrated in FIG. 1.

Figure 2:
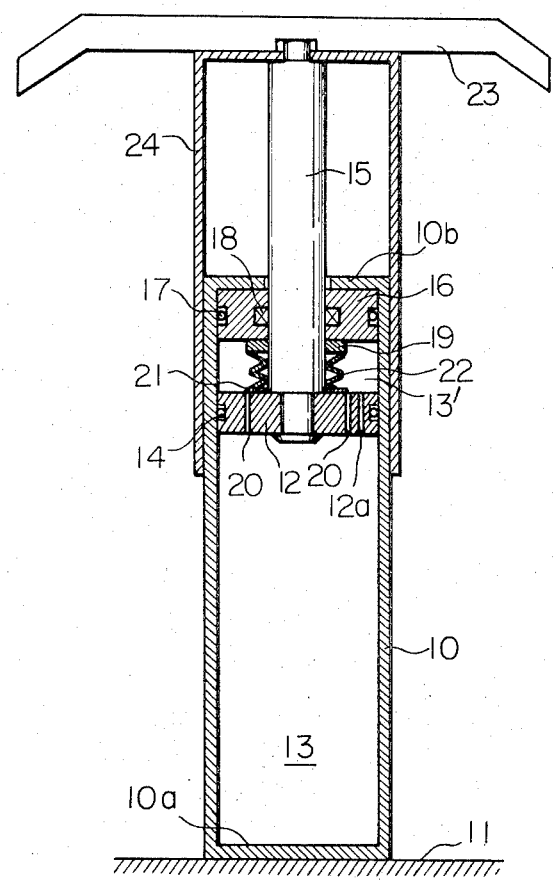
FIG. 2 is a longitudinal sectional view of a preferred embodiment of the impact absorbing device according to the present invention.

With this in mind, reference is now made to FIG. 2 showing a first preferred embodiment of the impact absorbing device using the compressible liquid having such prominent properties.

The impact absorbing device as shown includes a cylinder 10 which is secured directly or through a suitable intermediate member to a fixed structure 11. This fixed structure 11 may be a portion of a body structure of a motor vehicle where the impact absorbing device is used as a bumper thereof. The cylinder 10 has a closed end wall 10a which is shown as fast on the fixed structure 11 and an apertured end wall 10b which is remote from the fixed structure. The cylinder 10 thus defines therein a liquid compartment (not numbered) which is occupied with a compressible liquid such as for example silicon oil. Here, it is to be noted that, in spite of the limitative designation "cylinder," the cylinder 10 may not necessarily have a circular cross section. The cylinder 10 may have any desired cross section such as a rectangular cross section.

A piston 12 is longitudinally slidable or reciprocable within the cylinder 10, closely fitting on an inner peripheral surface of the cylinder. The piston 12 thus divides the liquid chamber into two compartments 13 and 13' which are located on both sides of the piston. These liquid compartments 13 and 13' are in constant communication with each other through a restricted passage 12a which is formed in the piston 12. The piston 12 usually has formed in its outer peripheral wall an annular groove (not numbered) in which a piston ring 14 is closely received so as to hermetically isolate the liquid compartments 13 and 13' from each other. A piston rod 15 extends from the piston 12 and projects outwardly through the liquid compartment 13' and the apertured end wall 10b of the cylinder. Between the inner peripheral surface of the cylinder 10 and the piston rod 15 is interposed an annular end plug 16 which is seated on an inner face of the apertured end wall 10b.

This annular end plug 16 is usually provided with an O-ring 17 which is embedded in its outer peripheral wall and an annular sealing member 18 which is embedded in its inner peripheral wall, whereby the liquid compartment 13' is hermetically sealed off from the apertured end wall 10b.

Suitable pressure relief valve means may be provided so that the liquid in the compartment 13 is admitted to the compartment 13' when the pressure in the former rises beyond a predetermined level during operation of the device. Such relief valve means is shown as comprising one or more passages 20 formed in the piston 12 to provide communication thereacross, a resilient valve plate or member 21 resting on the piston 12 in a position to normally close the passage or passages 20 and an initially coned disc spring (Belle-ville spring) 22 which is seated at one end on the valve plate 21. The other end of the spring 22 rests against an annular spring bearing 19 secured to the piston rod. When the device as shown is held in an inoperative condition, bearing 19 is in an abutting engagement with the end plug 16 so that the piston 12 is held in its outer limit position. The spring constant of the spring 22 and/or the resiliency of the valve plate 21 are so selected that the valve plate 21 is warped away from the face of the piston 12 to open the passage or passages 20 when subjected to a liquid pressure higher than the predetermined level.

The piston rod 15 has mounted at its leading end a fender or bumper 23 which is to directly bear the impact during the operation of the device. If desired, the cylinder 10 may be capped by a rigid sleeve 24 which is connected to the fender 23 as illustrated.

When, now, a load resulting from an impact is exerted on the fender 23, then the piston rod 15 is forced to retract into the liquid chamber in the cylinder 10 so that the compressible liquid in the compartment 13 is admitted to the compartment 13' through the restricted passage 12a in the piston 12 at a rate substantially proportional to the movement of the piston away from the end plug 16. This causes the pressure in the compartment 13 to rise and consequently a reaction is imparted to the piston rod 15 against the force of the impact. Thus, the compressible liquid in the compartment 13 is compressed in proportion to the amount of displacement of the piston rod 15 within the liquid compartment 13', thereby providing a spring action to the piston 12.

As previously noted, the viscosity of a compressible liquid, sharply increases as the pressure thereof increases. As the piston rod 15 is forced into the liquid chamber and consequently the pressure in the chamber rises, the viscosity of the liquid in the compartment 13 increases markedly so that the flow of the liquid passing through the restricted passage 12a in the piston is subject to an increasing resistance. The force of the impact transmitted to the piston 12 is consequently dampened due to the restriction by the passage 12a depending upon the displacement of the piston rod 15 and the variation in the viscosity of the liquid in the compartment 13. The energy of the impact is in this manner absorbed at an increased efficiency due to the spring action resulting from the rise in the viscosity in the compressible liquid.

The piston rod 12 forced into the liquid chamber is acted upon by the pressure of the liquid in the compartment 13' at a magnitude dictated by a cross sectional area of the piston rod, thus being subject to a tendency of returning toward the initial position. When, therefore, the load on the fender 23 is removed or otherwise diminished, the piston rod 15 and accordingly the piston 12 are allowed to restore themselves to their initial positions. In this condition, the liquid in the compartment 13' moves back to the compartment 13 via the restricted passage 12a in the piston. The rate of such returning flow of the liquid is limited by the restriction excersied by the passage 12a so that the piston rod 15 is prevented from being rebounded after the impact condition has terminated.

In the event the pressure in the compartment 13 rises beyond a predetermined level when the piston rod 15 is being subjected to the force of the impact, then the resilient valve plate 21 is caused to warp away from the piston 12 against the action of the coned disc spring 22 with the result the liquid in the compartment 13 is allowed into the compartment 13'. The pressure in the compartment 13 is consequently prevented from increasing any longer so that the reaction imparted to the piston rod 12 can be maintained below a predetermined magnitude.

Where, as previously pointed out, the device having the construction shown in FIG. 2 is placed in use under a condition in which the ambient temperature is subject to fluctuations, the liquid therein tends to expand or contract in the liquid chamber even though the liquid was initially supplied into the cylinder in a certain volume and a certain pressure. The pressure in the liquid chamber will therefore fluctuate with the result that the stability of the energy absorbing characteristics of the device is more or less impaired. The embodiment shown in FIG. 2 is constructed in such a manner that the expansion or contraction of the liquid due to such fluctuations in temperature is compensated for by means of a simple arrangement.

Figure 3:
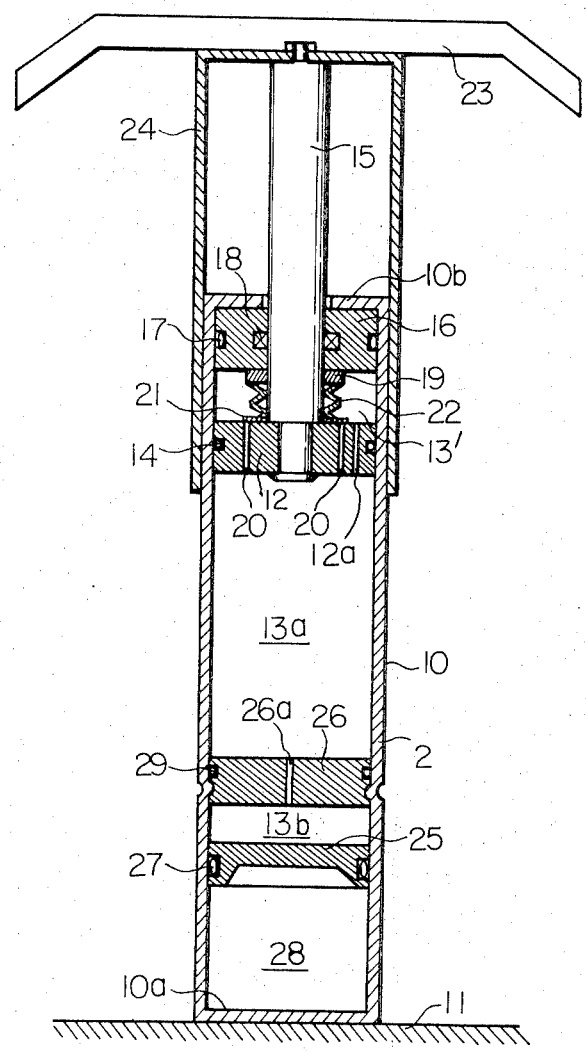
FIG. 3 is a view similar to FIG. 2 but illustrates another preferred embodiment of the impact absorbing device.

In addition to the previously described parts and elements forming the device of FIG. 2, the device shown in FIG. 3 includes compensating means comprising movable partition means 25 and a fixed partition member 26, both mounted within the cylinder 10. The movable partition means 25 is herein exemplified as a floating piston but the same may be constituted as a bellows or a diaphragm if preferred. Where, thus, the floating piston is used, a piston ring 27 is usually interposed between the inner peripheral wall of the cylinder 10 and an annular groove (not numbered) formed in the piston, as illustrated. The floating piston 25 is movable toward and away from the closed end wall 10a of the cylinder 10 and defines a gas chamber 28 between it and the end wall 10a. This gas chamber 28 is filled with a gas under pressure such as pressurized nitrogen gas. The fixed partition member 26, on the other hand, is fixed on the inner peripheral wall of the cylinder 10 and located intermediate between the piston 12 and the floating piston 25 so as to divide the liquid chamber 13 into two compartments 13a and 13b. A restricted passage 26a is formed in this fixed partition member 26, thereby providing constant liquid communication between the liquid compartments 13a and 13b. This restricted passage 26a preferably has a cross sectional area which is smaller than that of the restricted passage 12a in the piston 12. Designated by reference numeral 29 is an annular sealing member which is interposed between the inner peripheral wall of the cylinder 10 and the fixed partition member 26. The device shown in FIG. 3 thus has three separate but mutually communicating liquid compartments 13a, 13 b and 13' and a gas chamber 28 which is isolated from the liquid compartment 13b adjacent thereto. The device of FIG. 3 is constructed similarly in other respects to the device of FIG. 2 and, as such, corresponding parts are indicated by like reference numerals.

If, now, the piston rod 15 is caused to softly protrude into the liquid chamber toward the fixed partition member 26, then the liquid in the intermediate liquid compartment 13a is admitted partly to the liquid compartment 13' through the restricted passage 12a at a rate proportional to an amount of movement of the piston 12 and partly to the liquid compartment 13b through the restricted passage 26a in the fixed partition member 26 at a rate proportional to an amount of displacement of the piston rod 15 into the liquid compartment 13'. This gives rise to the liquid pressure in the compartment 13b. The floating piston 25 is thus subjected to the increased pressure and hence moved away from the fixed partition member with a resultant increase in the pressure in the gas chamber 28. Since, in this instance, the gas in the gas chamber 28 has a compressibility which is far greater than that of the liquid, the rise in the liquid pressure resulting from the displacement of the piston rod 15 is largely cancelled by the contraction of the gas in the gas chamber 28.

When, in operation, an impact load is exerted on the fender 23 and accordingly the piston rod 15 is caused to violently protrude into the liquid chamber, then the liquid in the compartment 13a flows into the compartments 13' and 13b through the restricted passage 12a and 26a, respectively. Since the passage 26a is smaller in cross sectional area than the passage 12a as previously noted, the liquid is passed to the compartment 13' at a higher rate than to the compartment 13b with the result that a major portion of the increment of the liquid pressure proportional to the displacement of the piston rod into the liquid chamber is used in compressing the liquid. The energy of the impact is in this manner absorbed at an efficiency which is comparable to that attained in the device shown in FIG. 2 insofar as the piston rod 15 is moved violently or instantaneously.

If the device thus constructed is used where elevated temperature prevail, the liquid in the liquid chamber expands and consequently the liquid in the compartments 13a and 13' is passed to the compartment 13b. The pressure in the compartment 13b is thus increased as a result of such flow of the liquid from the compartments 13a and 13' and of the expansion of the liquid in the compartment 13b itself. The floating piston 25 is therefore moved toward the closed end wall 10a so that the pressurized gas in the gas chamber 28 is further compressed appreciably. Such movement of the floating piston 25 terminates when the liquid pressure in the compartment 13b is equalized with the gas pressure in the gas chamber 28. The increases in the volume of the liquid due to the temperature rise is in this manner accommodated by the expansion of the liquid chamber so that the pressure of the liquid is prevented from rising excessively. The pressure in the liquid chamber will increase as a result of the pressure rise in the gas chamber. Such increase in the pressure in the liquid chamber is, however, practically negligible as compared with a rise in the liquid pressure otherwise resulting from expansion of the liquid confined in a chamber having a fixed capacity. As a matter of fact, the experiments conducted by me with a device using 100cc of methyl-silicon oil compressed to 100 kgs/cm² and 30cc of a gas compressed to 100 kgs/cm² have indicated that, if the ambient temperature is increased through a region of about 80° C, then the rise in the liquid pressure is only about 120 kgs/cm² while the same is of the order of 600 kgs/cm² if the methyl-silicon oil alone is used.

It is apparent that contraction of the liquid in the liquid chamber due to a temperature drop is followed by expansion of the gas chamber so that the pressure of the liquid can be prevented from being excessively lowered.

It will now be appreciated from the foregoing description that the impact absorbing device herein disclosed is adapted to make available an increased impact-energy absorbing and dissipating efficiency and improved spring characteristics through utilization of the compressibility and viscosity of a compressible liquid which has thus far been regarded as useless in impact absorbing devices. Such impact absorbing device is operable on a repeated basis over an extended period of time and is ready for installation in a limited working space because of its small-sized construction. The device according to the present invention is thus adapted for being used as a bumper of motor vehicles although applications of the device are not limited thereto.

What is claimed is:

1. An impact absorbing device including, a cylindrical housing defining a liquid chamber; a piston mounted for reciprocatory motion in said liquid chamber and dividing said chamber into two liquid compartments; a piston rod connected to said piston and extending from same through one of said liquid compartments outward of said housing and mounted for retractable and extendible motion with respect to said housing; a compressible liquid filling said liquid chamber; means defining a restricted passageway extending through said piston providing fluid communication between said two liquid compartments to decrease the resistance of the liquid to the retractive movement of said piston rod and simultaneously attenuating the springing energy of the liquid due to the compression thereof whenever said piston rod is extending; pressure relief valve means comprising means defining at least one relief aperture in said piston, and means normally closing said aperture and for opening same to relieve the liquid pressure within the other of said compartments whenever said pressure reaches a predetermined valve whereby a sudden rebound of said piston rod is prevented by said restricted passageway and said relief valve means; a movable partition sealingly mounted for reciprocatory motion in said cylindrical housing and defining therein a gas chamber which is isolated from said liquid chamber by said partition and which contains therein a gas under pressure; and a fixed partition member disposed between said piston and said movable partition and having means defining therein a restricted passage for providing liquid communication therebetween.

2. An impact absorbing device according to claim 1, wherein said restricted passage in said fixed partition member is smaller in cross-sectional area than said restricted passageway in said piston.

3. An impact absorbing device according to claim 1, further comprising a vehicle fender securely connected to a leading end portion of said piston rod and a rigid sleeve surrounding a portion of said cylinder and secured at its end to said fender.

4. An impact absorbing device according to claim 1, wherein said means for normally closing said aperture and for opening same comprises a flexible valve member resting upon said piston normally closing said pressure relief aperture, a spring disposed between said valve plate upon said piston, and a spring bearing secured to said piston rod for supporting said spring thereon, said valve member being flexed away from said piston against the force of said spring whenever the pressure of the liquid within said other of said liquid compartments rises to said predetermined value.

5. An impact absorbing device according to claim 1, in which said compressible liquid comprises a silicon oil.

6. An impact absorbing device comprising a cylinder having an open end portion and a closed end portion; a piston mounted in said cylinder for reciprocatory motion therein and having a piston rod connected thereto and liquid-tightly mounted within said open end portion thereby defining a first variable volume chamber between said open end portion and said piston and defining a second variable volume chamber between said piston and said closed end portion; a compressible liquid contained within said first and second chambers whereby the liquid in said second chamber is compressed whenever an impact force is axially applied to said piston rod; means defining an aperture through said piston providing communication between said first and second chambers; pressure relief valve means for relieving the pressure of said compressible liquid in said second chamber whenever same is greater then a predetermined valve comprising means defining at least one aperture in said piston providing communication between said first and second chambers, a flexible valve member disposed in said first chamber and covering said at least one aperture, and a spring disposed between said open end portion and said flexible valve member biasing said valve member towards said piston and for preventing said flexible valve member from flexing away from said at least one aperture until a force greater than said predetermined value is applied thereto; and compensating means for compensating for the expansion of said compressible liquid due to increases in temperature comprising a fixed partition disposed between said piston and said closed end portion thereby defining a third liquid chamber receiving therein said compressible liquid and having means therein defining an aperture providing communication between said second and third chambers, a movable partition fluid-tightly mounted between said fixed partition and said closed end portion thereby defining a fourth chamber containing therein a compressible gas compressed by said movable partition upon application of a force thereto developed by said compressible liquid as a result of the expansion of same due to an increase in temperature.

7. An impact absorbing device according to claim 6, wherein said aperture in said fixed portion has a smaller cross-section area than said aperture in said piston so that a major portion of said compressible liquid passes through said first mentioned aperture thereby minimizing the compression force on said gas when an impact force is applied.

8. An impact absorbing device according to claim 6, further comprising a vehicle bumper rigidly connected to said piston rod.

9. An impact absorbing device according to claim 6, wherein said compressible liquid comprises silicon oil.

* * * * *

UNITED STATES PATENT OFFICE
CERTIFICATE OF CORRECTION

Patent No. 3,804,443          Dated April 16, 1974

Inventor(s) Koichi KOMATSU

It is certified that error appears in the above-identified patent and that said Letters Patent are hereby corrected as shown below:

In the heading of the patent, Item [73] labeled Assignee, add the assignee Atsugi Motor Parts Company, Limited
              Atsugi City, Japan.

Signed and sealed this 26th day of November 1974.

(SEAL)
Attest:

McCOY M. GIBSON JR.          C. MARSHALL DANN
Attesting Officer             Commissioner of Patents